(Model.)

R. E. HUMPHREYS.
BICYCLE SADDLE.

No. 328,682. Patented Oct. 20, 1885.

WITNESSES:

INVENTOR:
R. E. Humphreys
BY Munn & Co
ATTORNEYS.

UNITED STATES PATENT OFFICE.

ROBERT E. HUMPHREYS, OF IRWIN, PENNSYLVANIA.

BICYCLE-SADDLE.

SPECIFICATION forming part of Letters Patent No. 328,682, dated October 20, 1885.

Application filed March 10, 1885. Serial No. 158,371. (Model.)

*To all whom it may concern:*

Be it known that I, ROBERT E. HUMPHREYS, of Irwin, in the county of Westmoreland and State of Pennsylvania, have invented a new and Improved Spring Bicycle-Saddle, of which the following is a full, clear, and exact description.

The object of my invention is to provide a new and improved combined spring and seat or saddle for bicycles and other velocipedes.

The invention consists in the combination, with a curved piece, of a spring-rod secured and bent to form the supporting-springs and the horn.

Reference is to be had to the accompanying drawings, forming a part of this specification, in which similar letters of reference indicate corresponding parts in both the figures.

Figure 1:
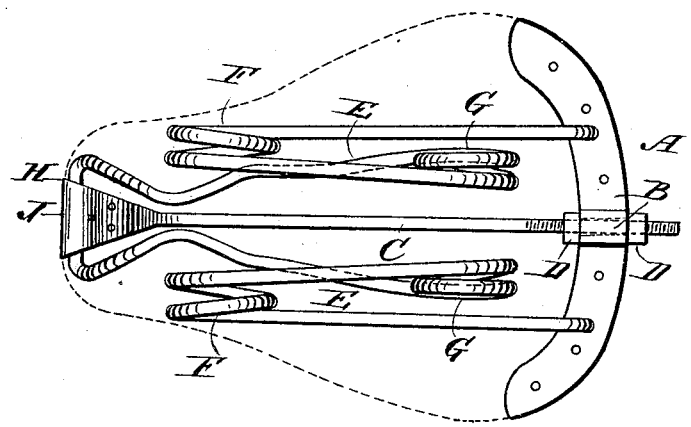
Figure 2:
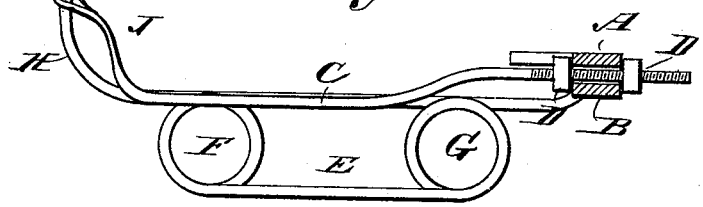

Figure 1 is a plan view of the under side of my improved bicycle-saddle. Fig. 2 is a longitudinal sectional elevation of the same.

The back of the saddle is formed of a curved piece of metal, A, at the middle of which a pocket, B, is formed, through which the screw-threaded part of a rod, C, is passed, and on the said rod the nuts D are screwed, one at each end of the pocket.

A rod, E, of spring metal has its ends secured in the piece A at each side of the rod C, is carried forward, forms the coil-springs F at the front of the saddle, then toward the rear, then forms coil-springs G, and is then carried to the front and bent upward at the middle of its entire length, and forms the horn H, to which the upwardly-projecting front part, J, of the rod C is secured. A covering of leather, canvas, or other material is secured on the horn and the curved piece A.

The tension of the spring-support formed by the rod C can be adjusted by the nuts D.

The spring is thus formed of a single piece. The saddle rocks forward and back, up and down, and laterally, and is thus very convenient and easy for the rider.

Having thus described my invention, I claim as new and desire to secure by Letters Patent—

1. In a velocipede-saddle, the combination, with a curved bar or piece, of a spring-rod having its ends secured on the curved piece and bent to form coil-springs and a horn, and a rod connecting the horn with the curved piece, substantially as herein shown and described.

2. In a velocipede-saddle, the combination, with a curved bar or piece, A, having a pocket, B, of the spring-rod E, forming springs and a horn, H, the rod C passed through the pocket B and secured to the horn, and the nuts D D, substantially as herein shown and described.

3. In a bicycle-saddle, a spring-rod forming the spring-support for the saddle, and also the horn of the saddle, substantially as herein shown and described.

ROBERT E. HUMPHREYS.

Witnesses:
BEN STEELE,
D. M. DAVIS.